(12) United States Patent
Thi et al.

(10) Patent No.: US 7,747,002 B1
(45) Date of Patent: Jun. 29, 2010

(54) METHOD AND SYSTEM FOR STEREO ECHO CANCELLATION FOR VOIP COMMUNICATION SYSTEMS

(75) Inventors: James C. H. Thi, Irvine, CA (US); Theodore F. Rabenko, Duluth, GA (US)

(73) Assignee: Broadcom Corporation, Irvine, CA (US)

(*) Notice: Subject to any disclaimer, the term of this patent is extended or adjusted under 35 U.S.C. 154(b) by 886 days.

(21) Appl. No.: 09/703,264

(22) Filed: Oct. 31, 2000

Related U.S. Application Data

(60) Provisional application No. 60/189,713, filed on Mar. 15, 2000.

(51) Int. Cl.
H04M 9/08 (2006.01)
(52) U.S. Cl. .................................. 379/406.08
(58) Field of Classification Search ................................
379/406.01–406.16, 114.01
See application file for complete search history.

(56) References Cited

U.S. PATENT DOCUMENTS

| | | | | |
|---|---|---|---|---|
| 3,433,898 | A * | 3/1969 | Sellenslagh et al. | 379/126 |
| 5,396,517 | A | 3/1995 | Yedid et al. | 375/233 |
| 5,570,295 | A * | 10/1996 | Isenberg et al. | 379/90.01 |
| 5,600,714 | A * | 2/1997 | Eppler et al. | 379/406.08 |
| 5,706,344 | A * | 1/1998 | Finn | 379/406.09 |
| 5,732,134 | A * | 3/1998 | Sih | 379/406.13 |
| 5,905,717 | A * | 5/1999 | Hasegawa | 370/289 |
| 6,252,900 | B1 * | 6/2001 | Liu et al. | 375/219 |
| 6,556,682 | B1 | 4/2003 | Gilloire et al. | |
| 7,023,812 | B1 * | 4/2006 | Beyda et al. | 370/286 |

FOREIGN PATENT DOCUMENTS

| | | |
|---|---|---|
| EP | 0 501 451 | 9/1992 |
| EP | 0 501 451 A2 | 9/1992 |
| FR | 2 762 467 A1 | 10/1998 |

OTHER PUBLICATIONS

Communication Relating to the Results of the Partial International Search for Application No. PCT/US01/08363, filed on Mar. 15, 2001.
International Preliminary Examination Report from the European Patent Office for International Application No. PCT/US2001/08363, dated Apr. 3, 2002, 2 pages.
Office Action for European Patent Appl. No. 01 920 406.4, mailed Jul. 18, 2003, 6 pgs.

* cited by examiner

*Primary Examiner*—Alexander Jamal
(74) *Attorney, Agent, or Firm*—Sterne, Kessler, Goldstein & Fox, P.L.L.C.

(57) ABSTRACT

An exemplary embodiment of the present invention is directed toward a method and system for cancelling line echo in the presence of a known secondary audio signal. Filter adaption is enabled in the presence of a known secondary audio source such as the sound of a computer game, a music signal or other secondary audio sources that would otherwise prevent echo cancellation due to an apparent double talk condition. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

39 Claims, 9 Drawing Sheets

US 7,747,002 B1

METHOD AND SYSTEM FOR STEREO ECHO CANCELLATION FOR VOIP COMMUNICATION SYSTEMS

CROSS-REFERENCE TO RELATED APPLICATION

This application claims priority to U.S. Provisional Patent Application No. 60/189,713, filed Mar. 15, 2000 the contents of which is hereby incorporated by reference.

FIELD OF THE INVENTION

The present invention relates generally to telecommunications systems and more particularly to an apparatus and method for cancelling line echos in a telecommunications system.

BACKGROUND

Speech quality has become a highly competitive factor in marketing telephony systems. Line or electrical echo, a phenomenon typically caused by imperfect impedance matching of network transmission sections, may significantly degrade the overall speech quality of telephony systems.

Similarly, acoustic echo may also degrade the quality of speech in a telephony system. Acoustic echo may be seen, for example, in communication devices having a near end microphone exposed to a loudspeaker driven by a far end signal or a secondary audio signal. In a full-duplex system, simultaneous two-way communication is enabled where the local user can speak and listen to received speech simultaneously with the remote user. Such simultaneous conversation, however, may create acoustic feedback problems which occur when the near end microphone picks up the far end loudspeaker signal and directs the far end loudspeaker signal back to the remote end. As a result, the remote party may hear a delayed version of their own speech referred to as an acoustic echo.

Echo cancellers have been used to remove far end electrical and acoustic echo. Typically, echo cancellers utilize adaptive filters that model the electro/acoustical echo path. The algorithm coefficients of the filter are continuously adapted to represent the impulse response of the acoustic echo path, such as for example, between the loudspeaker and microphone or the impulse response between the transmit channel and the receive channel of the network interface. The modeled responses are then subtracted from an outgoing communication signal to yield an echo reduced communication signal. However, near end speech may act as an unwanted noise signal causing the adaptive filter to diverge. Therefore, echo cancellers typically include double talk detection logic that halts filter adaptation when near end speech is active.

Acoustic echo cancellers and electrical echo cancellers operating in the presence of a secondary audio tone, such as for example, a pulse metering tone, typically utilize multiple adaptive filters. In the case of electrical echo, separate adaptive filters are typically used to separately cancel the primary and secondary audio signals. Similarly, acoustic echo cancellers typically utilize an adaptive filter to estimate the impulse response between the microphone and loudspeaker. A second electrical echo canceller is typically implemented across the transmit and receive channels to cancel the electric reflection of signals generated by an impedance mismatch at the hybrid interface.

However, the utilization of multiple adaptive filters increases the complexity and computational intensity of the echo canceller system. In addition, double talk detection logic typically declares near end speech active whenever a local near end signal is present in either adaptive filter. Therefore, echo canceller performance may be seriously degraded in applications where a secondary audio tone or signal is present at substantially all times.

Therefore it would be advantageous to have a system and method that enables filter adaptation, and thus echo cancellation in the presence of a known secondary audio signal such as a music signal, a pulse metering tone or the sound of a computer game.

SUMMARY OF THE INVENTION

In one aspect of the invention, an echo canceller includes an adaptive filter having filter coefficients that may be adapted to cancel an echo of a composite far end signal having a secondary audio signal and a primary telephony signal in a near end signal.

In another aspect of the present invention, an echo canceller includes an adaptive filter having filter coefficients that may be adapted to cancel an echo of a composite signal comprising a secondary audio signal and a far end telephony signal in a near end signal.

It is understood that other embodiments of the present invention will become readily apparent to those skilled in the art from the following detailed description, wherein it is shown and described only embodiments of the invention by way of illustration of the best modes contemplated for carrying out the invention. As it will be realized, the invention is capable of other and different embodiments and the details are capable of modification in various other respects, all without departing from the spirit and scope of the present invention. Accordingly, the drawings and detailed description are to be illustrative in nature and not restrictive.

DESCRIPTION OF THE DRAWINGS

These and other features, aspects, and advantages of the present invention will become better understood with regard to the following description, appended claims, and accompanying drawings wherein:

DETAILED DESCRIPTION

An exemplary embodiment of the present invention provides an echo canceller system that is particularly well suited for use in communications networks where an echo is liable to occur in the presence of a secondary audio signal or an interference pulse metering tone. A described exemplary embodiment includes an adaptive filter that adapts in the presence of a known secondary audio signal such as for example, a music signal, a pulse metering tone or the sound of a computer game. For example, an exemplary echo canceller provides echo cancellation in a two-way telephony system while a movie is playing in the background via a cable-set-top box. Furthermore, echo cancellation may be provided during a double-talk condition in an interactive gaming environment where the double-talk condition may be caused by the sound of a computer game or an interference pulse metering tone at 12 kHz or 16 kHz.

Figure 1:
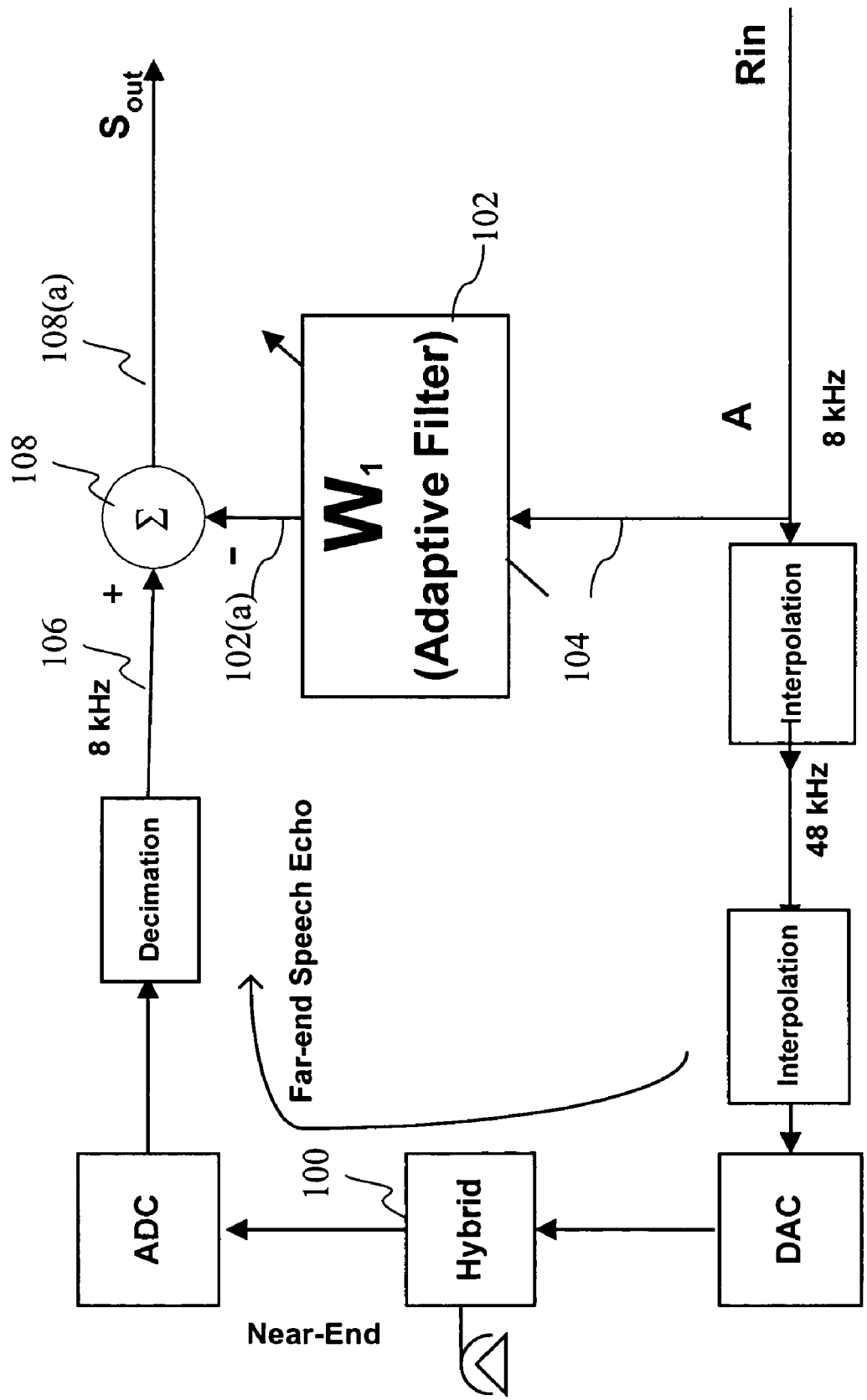
FIG. 1 is a simplified schematic diagram of the two-way telephony application.

FIG. 1 is a simplified block diagram of a two-way telephony application where an echo is generated from an impedance mismatch created by a two-wire to four-wire interface in hybrid circuitry 100. Ideally the hybrid gain would be zero to eliminate coupling between the far end and near end transmission paths. However, the operation of the hybrid 100 typically results in a frequency dependent gain of less than about one-half. Hybrid gain commonly results in line echos, such as the reflection of the talker's voice at the mismatch created by the two-four wire conversion.

A reference signal 104 is input into an adaptive filter 102 that models the transfer characteristics of the dialed telephone line (i.e. the hybrid plus the tail circuit that is the telephone line from DAC to ADC). The unwanted echo may then be canceled by subtracting filtered reference signal 102(a) from the near end digital input signal 106 in a difference operator 108. The filter adaptation is dependent on the subtracted signal 108(a) output by difference operator 108 (an error feedback). Therefore, near end speech and/or noise present on the near end digital input signal 106, typically referred to as the double talk condition, may cause the adaptive filter 102 to diverge. Thus, there should be no adaptation during the double-talk condition. That is, filter adaptation should be carried out only during those intervals when the far-end speech is present, but near-end speech is absent.

Figure 2:
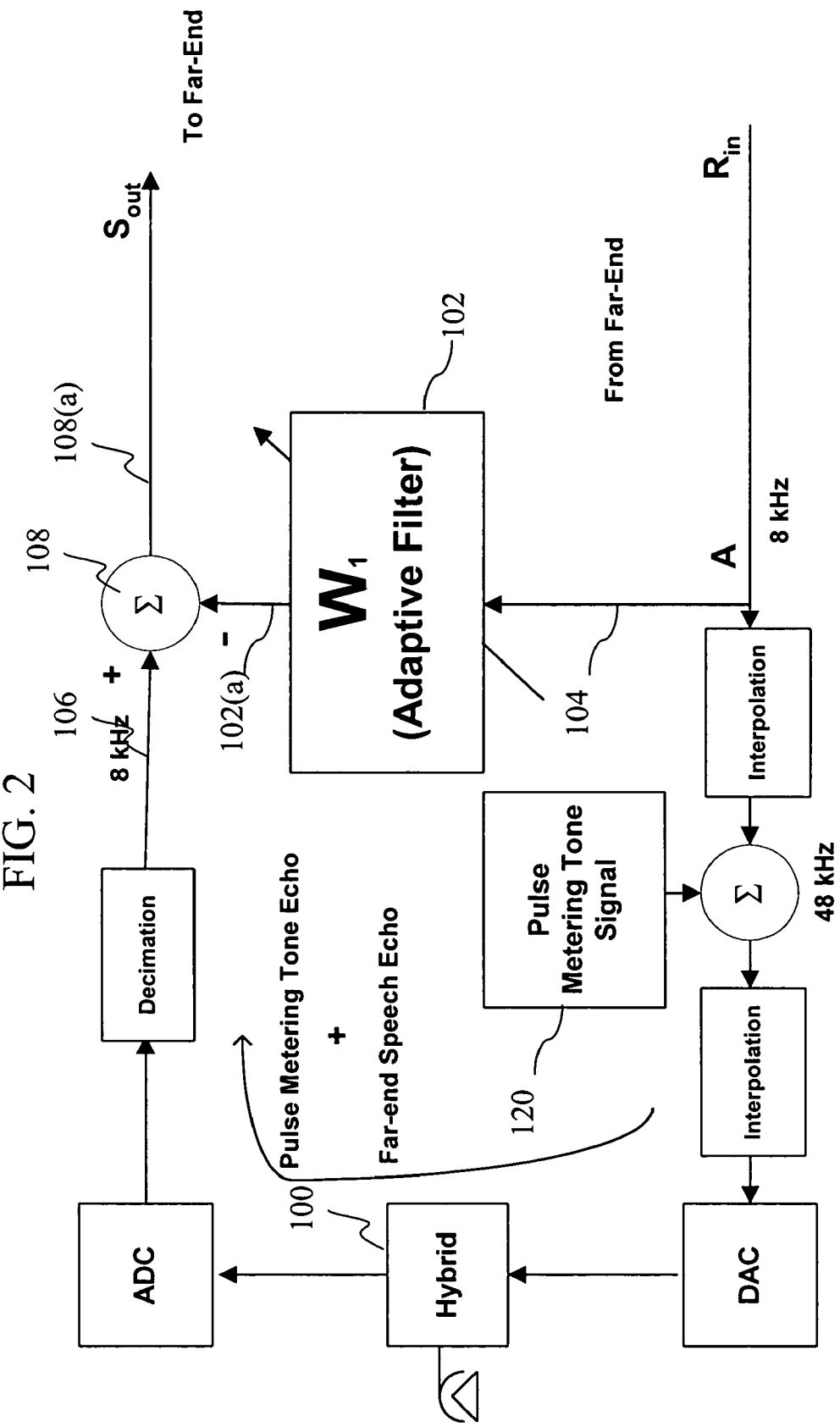
FIG. 2 shows the addition of a pulse metering tone in a public telephone.

FIG. 2 shows a simplified schematic diagram of the two-way telephony application of FIG. 1 having a pulse metering tone generator 120 that generates a pulse metering tone at a frequency of either 12 kHz or 16 kHz during substantially all intervals. The metering pulses allow a user to monitor the cost of a call as it progresses. In this and other embodiments, common reference numerals may be used to represent like components.

The rate at which the pulse metering tone generator 120 transmits the metering pulses varies depending on the rate per minute of the call. The minimum gap between pulses is, by way of example, on the order of about 100 msec but may be much greater for inexpensive local calls. The amplitude of the metered pulses can be adjustable to accommodate impedance changes during the on hook, off hook and ringing states. The harmonics associated with this pulse metering tone within the 4 kHz bandwidth may provide false feedback information, that may cause the adaptive filter 102 to diverge, consequently degrading the performance of the echo canceller.

Figure 3:
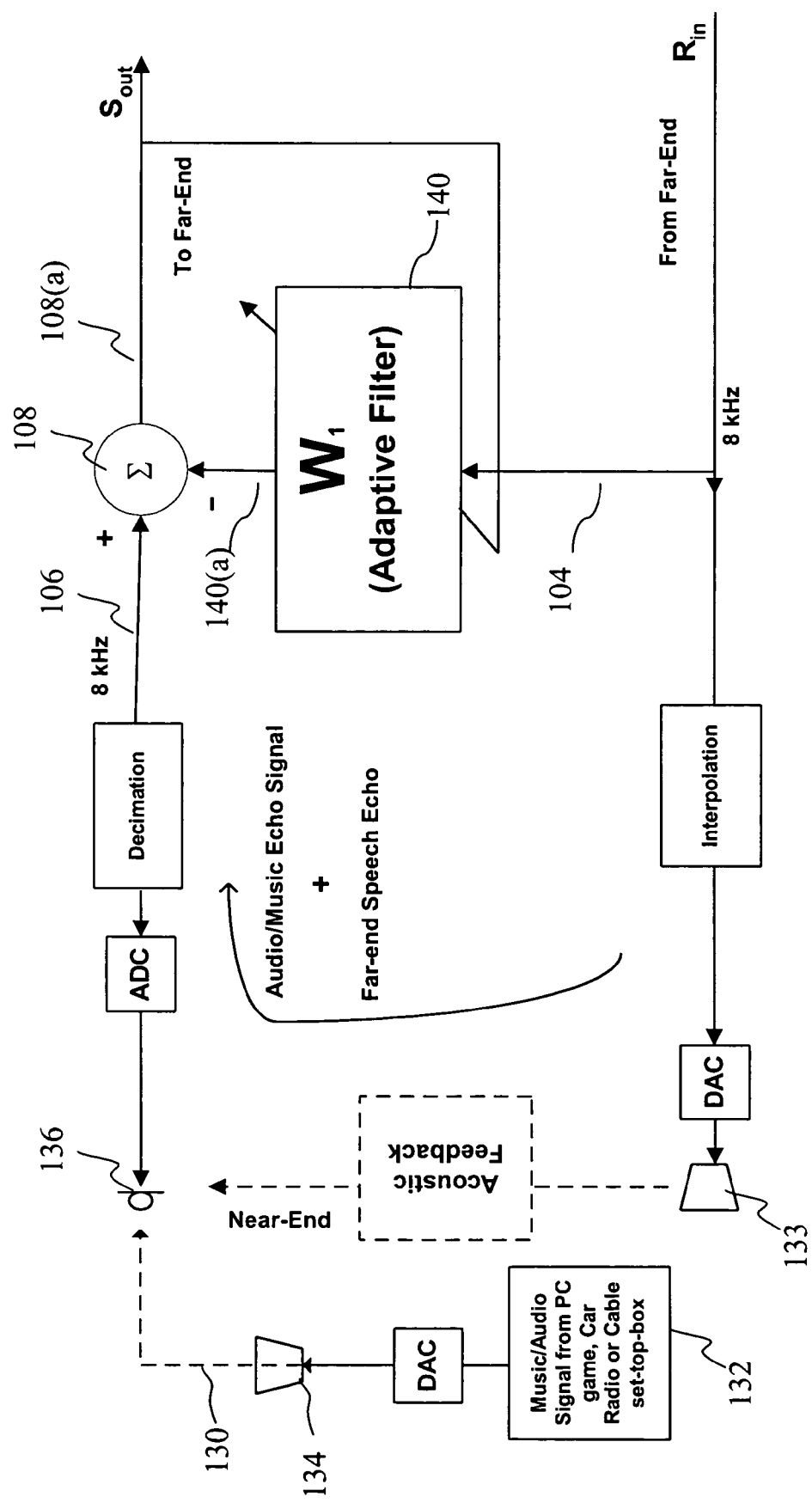
FIG. 3 shows the addition of an audio/music signal in an integrated telephony-ready cable-set-top-box.

FIG. 3 shows a simplified schematic diagram of the two-way telephony application of FIG. 1 wherein an audio signal or a music signal 130 is present on the far end signal resulting in near end acoustic feedback. The audio signal may result for example, from an integrated telephony-ready, cable-set-top-box. The music signal may be the result of a movie or a video game 132 playing out a speaker 134 simultaneously with a two-way phone-call, using speaker 133 and a microphone 136. Thus, the music signal is acting either as a noise source or as the near-end talker's voice. This additional signal may create a double-talk condition at substantially all times. Therefore, the echo canceller should disable adaptation since the music signal may cause the filter 140 to diverge.

Figure 4:
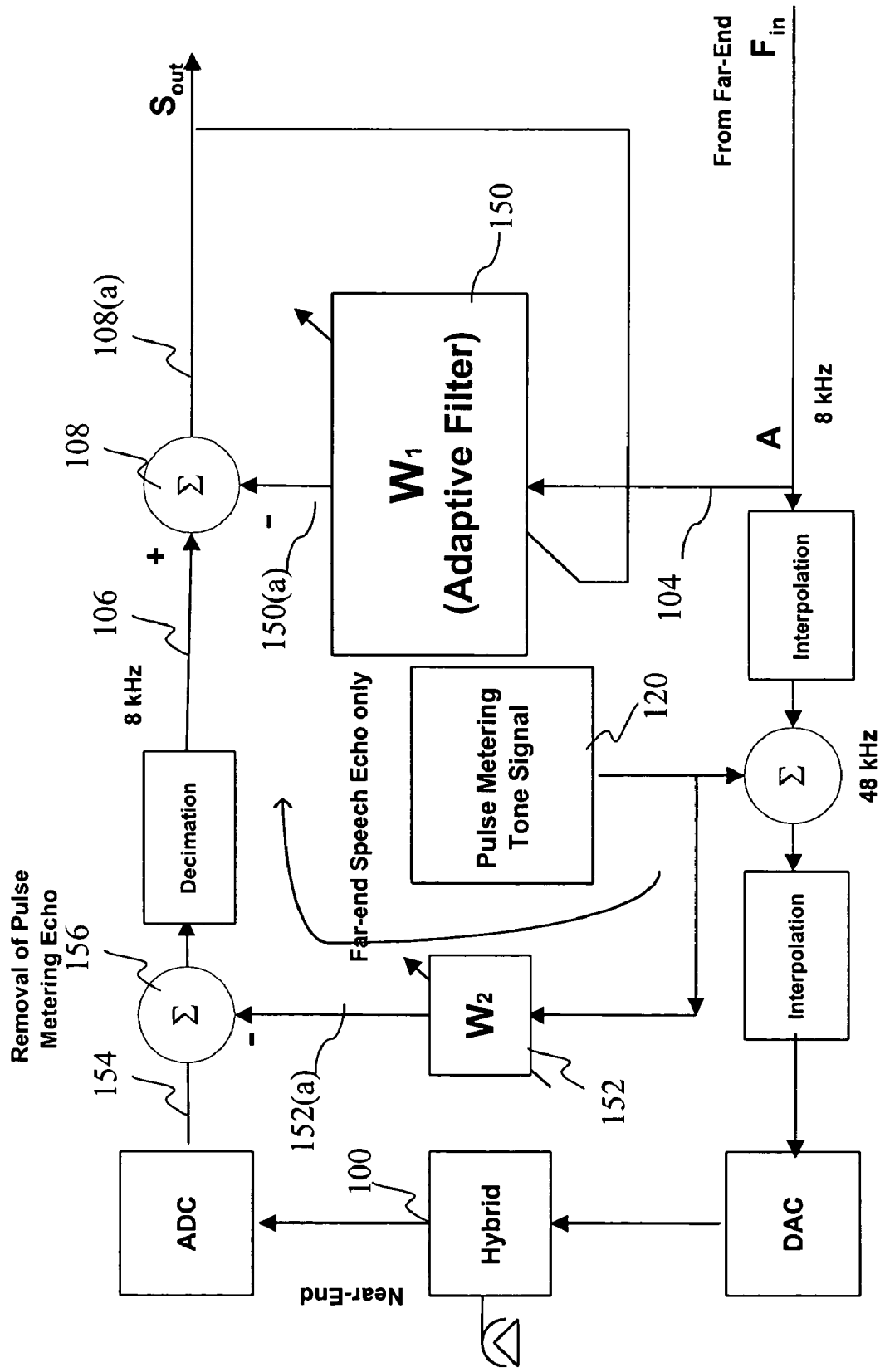
FIG. 4 shows the design of a VoIP system with a second adaptive filter for the removal of the echo associated with the pulse metering tone.

FIG. 4 shows a simplified schematic diagram of a two-way VoIP system including multiple adaptive filters 150 and 152. The second adaptive filter 152 operates at a sampling rate of 48 kHz. The higher sampling rate is necessary to avoid aliasing since the pulse metering tone has a frequency of 12 kHz or 16 kHz. The echo signal associated with this pulse metering tone may be canceled by subtracting filtered metered tone 152(a) from near end digital input signal 154 in a difference operator 156. However, the utilization of the second adaptive filter 152, at an increased sampling rate, generally increases the complexity and computational intensity of the echo canceller system.

Figure 5:
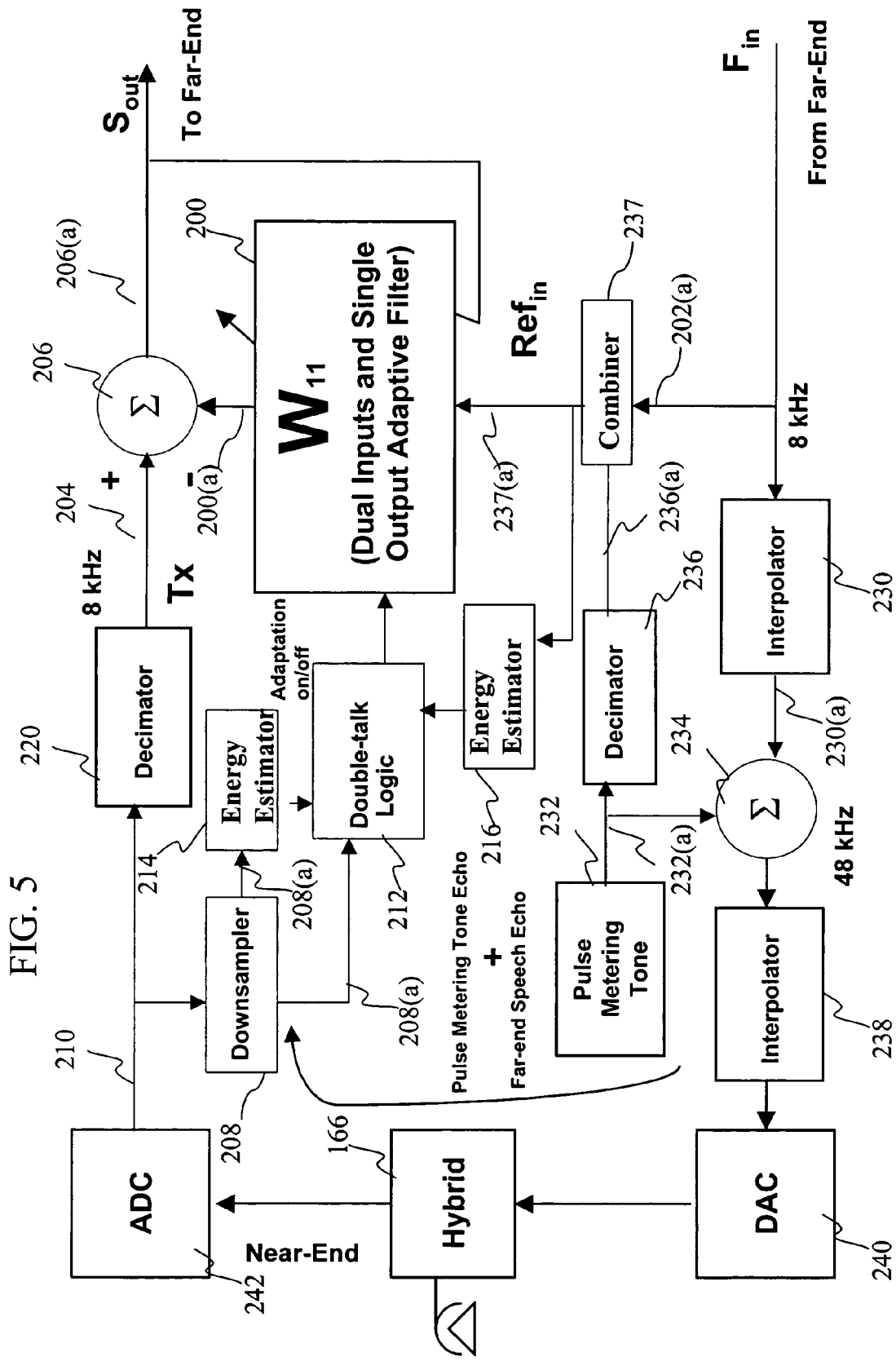
FIG. 5 is a simplified block diagram of an echo canceller having a single adaptive filter designed to adapt in the presence of a secondary audio tone in accordance with an exemplary embodiment of the present invention.
Figure 6:
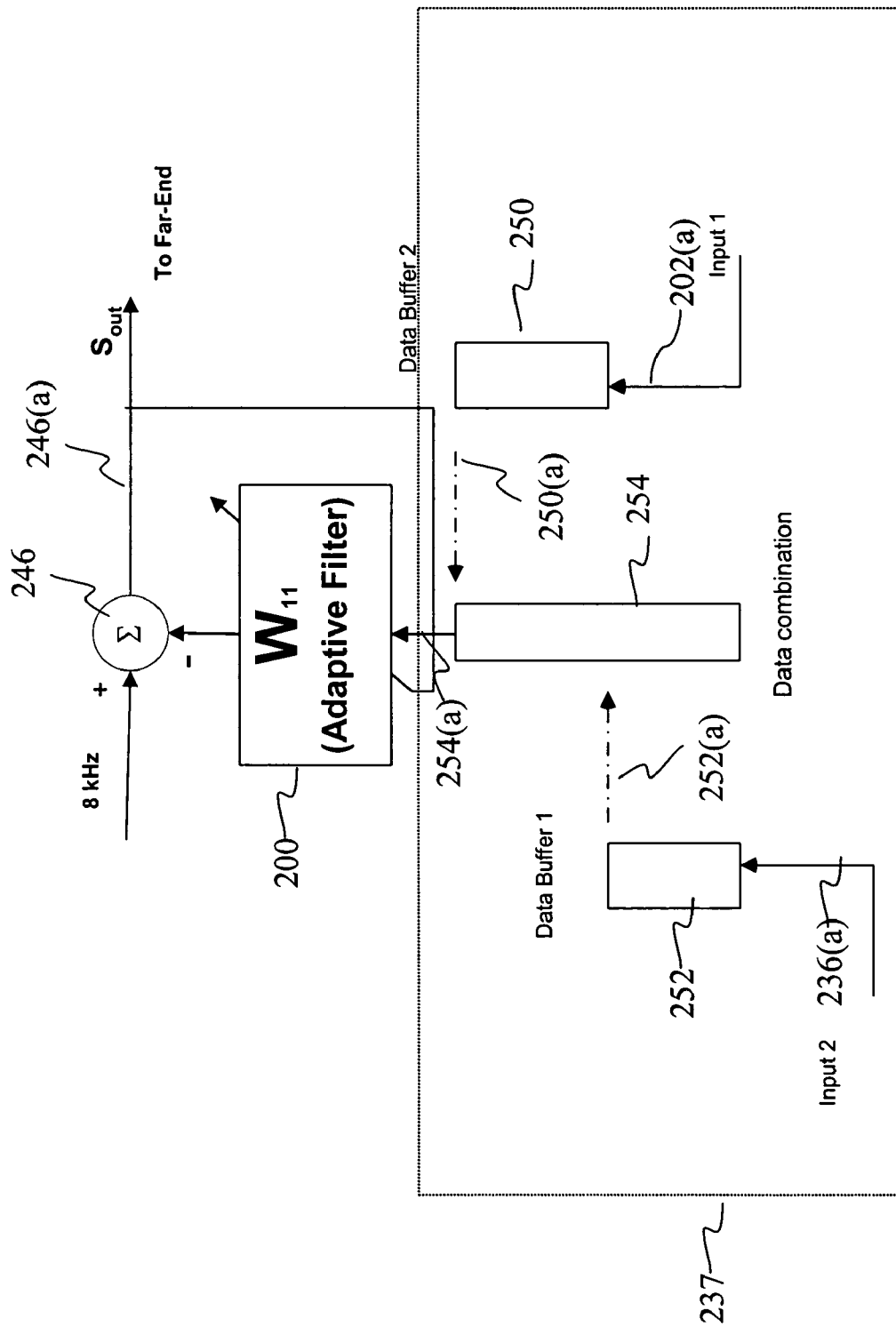
FIG. 6 shows the input data path wherein multiple inputs are combined to form a single reference signal input into the adaptive filter of FIG. 6, in accordance with an exemplary embodiment of the present invention.

FIGS. 5 and 6 show simplified schematic diagrams of an exemplary stereo echo cancellation system that provides echo cancellation in the presence of secondary audio tones, such as for example, pulse metering tones. Referring to FIG. 5, the described exemplary echo cancellation system combines a downsampled pulse metering tone 236(a) from a decimator 236 and a far end reference signal 202(a) into a single 8 kHz combined reference signal 237(a) through a combiner 237. The combined reference signal 237(a) may then be input into a single 8 kHz adaptive filter 200 rather than using two adaptive filters, one at 8 kHz and the other at 48 kHz as described in connection with FIG. 4. Therefore, the described exemplary embodiment requires less memory and processing resources.

In the described exemplary embodiment of FIGS. 5 and 6, the adaptive filter 200 may be a linear transversal filter or other suitable finite impulse response filter. The adaptive filter 200 models the transfer characteristics of the dialed telephone line circuit. The unwanted echo is canceled by subtracting filtered reference signal 200(a) from near end digital input signal 204 in a difference operator 206. Near end speech and/or noise present on the near end signal 204, typically referred to as the double talk condition, may cause the adaptive filter 200 to diverge. Therefore, double talk logic 212 detects near end speech and disables adaptation of the adaptive filter 200 when near end speech is active. One of skill in the art will appreciate that the present invention is not limited to a particular algorithm for detecting the double talk condition. However, conventional approaches that utilize energy estimates introduce delay into the detection of near end speech by the energy estimators (typically low pass filters) that may significantly corrupt the feedback error signal used for filter adaptation. Therefore, the described exemplary embodiment of FIGS. 5 and 6 utilize a sample based double talk detection algorithm that provides rapid detection of near end speech in the presence of far end speech. Look ahead capability may also be included so that the double talk logic may halt filter adaptation (i.e. freeze the filter taps or coefficients) before the near end speech samples reach the difference operator 206. A downsampler 208 decimates a 96 kHz near end Tx data 210 at a ratio of 12:1. The downsampler 208 forwards the decimated near end Tx data samples 208(a) to the double talk logic at an 8 kHz sample rate.

To minimize delay, the downsampler 208 does not low pass filter the near end Tx data samples 210 prior to decimation. Aliasing components that may be created are insignificant because the output of the downsampler 208(a) simply drives the double talk detection logic 212 and is not transmitted to the far end. An energy estimator 214 estimates the background noise level of the decimated near end Tx data signal 208(a) and forwards the estimated level to the double talk logic 212. The energy estimator 214 may be a low pass filter with a long time constant, on the order of about 10 seconds. With a long time constant the energy estimator tends to track the minimum energy level of the decimated near end Tx data signal 208(a). Similarly, a second energy estimator 216 estimates the short term energy of the combined reference signal 237(a).

To avoid divergence, the double talk logic 212 selectively enables the adaptive filter 200. The double talk logic 212 utilizes a sample based algorithm to detect the presence of near end speech without incurring the delays associated with conventional systems in accordance with the following equation:

$$|Near|>H^*Peak\{|Ref_{in}(n)|\}+Background\_Noise(n)$$

The double talk logic 212 declares near end speech active when the absolute value of the near end Tx data signal 210 is greater than the product of the hybrid gain (H) and a peak statistic of the combined reference signal 237(a) summed with the estimated background noise of the decimated near end Tx data signal 210. The hybrid gain is generally a constant less than about one-half. The background noise for a typical voice channel is on the order of about −70 dBm which is far less than average active speech levels, which are typically on the order of about −25 dBm. The background noise estimate is therefore initialized to a value of about −70 dBm and thereafter periodically updated by the energy estimator 214. The peak statistic of the combined reference signal is defined by the following logic:

If $\max\{A^*[|Ref_{in}(n)|, \ldots, |Ref_{in}(n-L-1)|]\} > Peak(n-1)$ then $Peak(n) = \max\{A[|Ref_{in}(n)|, \ldots, *|Ref_{in}(n-L-1)|]\}$ else $Peak(n) = d^*Peak(n-1);$ where A is a weighting function that is greater than zero and less than or equal to one. The parameter L is the number of samples over which the maximum is determined, typically in the range of zero to one hundred and twenty eight samples. In the described exemplary embodiment L is on the order of about sixty four samples. The parameter d is a constant that is also greater than zero and less than or equal to one and on the order of about 0.99 in the described exemplary embodiment.

Therefore, to determine the peak statistic of the far end, the double talk logic applies a weighting factor A to the absolute value of the current sample ($Ref_{in}(n)$) and previous L samples ($Ref_{in}(n-L)$). If the maximum product is greater than the previous peak statistic Peak(n−1) then the current peak statistic Peak(n) is set at the maximum of the product of the weighting factor and far end samples. Otherwise the current peak statistic Peak(n) is set equal to d times the value of the previous peak statistic Peak(n−1).

In the described exemplary embodiment, A, L and d are empirically determined to optimize performance and computational load for a given application. For example, double logic 212 can more accurately detect near end speech if the maximum is determined over a larger number of samples L. However, computational intensity also increases with increasing number of samples L. A and d can be inversely related to the number of sample L, so that A and d are smaller for larger number of samples and vice versa.

In the described exemplary embodiment, there is a delay associated with decimator 220. However, downsampler 208 does not low pass filter the near end TX data 210 and therefore does not have a corresponding delay. Therefore, the double talk logic 212 receives downsampled near end Tx data samples 208(a) with negligible delay and can process near end Tx data samples prior to their arrival at the difference operator 206. Thus, the delay associated with the second decimator 220 provides a look-ahead of M samples allowing the double talk logic 212 to disable adaptation of the adaptive filter 200, M samples before the near-end signal reaches the difference operator 206. The look ahead capability M is equivalent to the delay associated with the second decimator 220 and is typically two to three 8 kHz samples for a ITU-T G712 compliant system.

In the described exemplary embodiment, an interpolater 230 up-samples the signal from the far end (Rin) from 8 to 48 kHz. The interpolator 230 may be implemented with a FIR filter that may be either minimum phase or linear phase. A minimum phase filter is preferred for voice applications that require low group delay but may tolerate group delay distortion that may be introduced by the minimum phase filter.

In addition, a metering pulse generator 232 may be used to generate metering pulses 232(a) at a frequency of 12/16 kHz. In the described exemplary embodiment, a decimator 236 decimates or down samples the metering pulses 232(a) so that the sample rate of the music signal matches the sample rate of the far end reference signal 202(a), i.e. 8 kHz in the described exemplary embodiment. The decimated pulse metering tones 236(a) are forwarded to the combiner 237. The combiner 237 combines the decimated pulse metering tones 236(a) and the far end reference signal 202(a) into a single 8 kHz input 237(a) for the adaptive filter 200. The metering pulses are summed with the interpolated signal 230(a) by summer 234.

A second interpolater 238 upsamples the summed signal output by the summer 234 from 48 to 96 kHz. The interpolator 238 may again be implemented with a FIR filter. A digital to analog converter 240 converts the digital interpolated signal to an analog signal which is then transmitted to the near end. Reflections at the two-four wire conversion at the hybrid 166 may create an echo including metering tone echos and far end speech echo that is fed back to the near end.

An analog to digital converter 242 receives analog near end voice samples and converts the received analog signal to a digital format. The decimator 220 downsamples the received digital near end Tx data signal 210 from 96 kHz to an 8 kHz rate. The decimator 220 can be implemented with a FIR filter. The decimated signal 204 along with the output of the adaptive filter 200(a) are input to the difference operator 206 that cancels unwanted echo by subtracting the decimated signal 204 from the filter output signal 200(a).

Referring to FIG. 6, the combiner 237 of FIG. 5 may include a first buffer 250 that receives the far end reference signal 202(a) and a second buffer 252 that receives the decimated pulse metering tone 236(a). Buffer outputs 250(a) and 252(a) are then combined in a third buffer 254 whose output 254(a) is forwarded to the adaptive filter 200. One of skill in the art will appreciate that a single buffer could be used to directly combine the decimated metering tones 236(a) and far end reference signal 202(a).

The adaptive filter 200 may be based upon a normalized least mean square algorithm (NLMS) as described in S. Haykin, Adaptive Filter Theory, and T. Parsons, Voice and Speech Processing, the contents of which are incorporated herein by reference as if set forth in full. Referring back to FIG. 5, an error signal 206(a) at the output of the difference operator 206 that is feedback to the adaptive filter 200 for filter adaptation may be characterized as follows:

$$e(n) = Tx(n) - \sum_{j=0}^{M+N+1} w_{11}(j) \text{Re } f_{in}(n-j) \text{ where } j = 0, 1, 2 \ldots M+N+1$$

where e(n) is the error signal 206(a) at time n, $\text{Ref}_{in}(n)$ is the combined reference signal 237(a) at time n, Tx(n) is the decimated Tx data signal 204 input into the difference operator 206 at time n, and $w_{11}(j)$ are the coefficients of the transversal filter $W_{11}$.

In the described exemplary embodiment, data inputs from the first data buffer 250 are summed from j=0, 1, ... M and data inputs from the second data buffer 252 are summed from j=M+1, M+2, ... M+N+1. Thus, $\text{Ref}_{in}(0)$ is the most recent input 250(a) from the first data buffer 250 and $\text{Ref}_{in}(M)$ is the oldest input from the first data buffer. Therefore, $\text{Ref}_{in}(M-j)$ is the output of buffer one 250 delayed by M−j samples. Similarly, $\text{Ref}_{in}(M+1)$ is the most recent input 252(a) from the second data buffer 252 and $\text{Ref}_{in}(M+N+1)$ is the oldest input from the second data buffer 252.

In the described exemplary embodiment, M and N are parameters that may be selected to match the electrical path. Therefore in one embodiment, the dimension of the transversal filter may be the worst case echo path length. In the described exemplary embodiment, filter coefficients $W_{11}(j)$, for j=0 to M+N+1, are given by:

$$W_{11}(j) = w_{11}(j) + \mu * e(n) * \text{Ref}_{in}(n-j)$$

wherein $w_{11}(j)$ is preferably initialized to a reasonable value such as for example zero.

Assuming a block size of four msec (or 32 samples at a sampling rate of 8 kHz), the short term average energy of the reference signal $E_{ref}$ is the sum of the last 32 reference samples so that the convergence gain may be given by:

$$\mu = \frac{\alpha}{E_{ref(n)}}$$

where α is the adaptation step size and Eref is the sum of the squares of those samples $\text{Ref}_{in}(n)$ that are saved in the third buffer 254. In the described exemplary embodiment, α is set to zero when near end voice is detected so that the convergence gain µ is equal to zero and the filter coefficients are not updated. Otherwise α is set to a constant of less than one and preferably in the range of 0.8-0.95. One of skill in the art will appreciate that the adaptive filter may be implemented in a variety of ways, including fixed point rather than the described floating point realization. Accordingly, the described exemplary adaptation logic is by way of example only and not by way of limitation.

Figure 7:
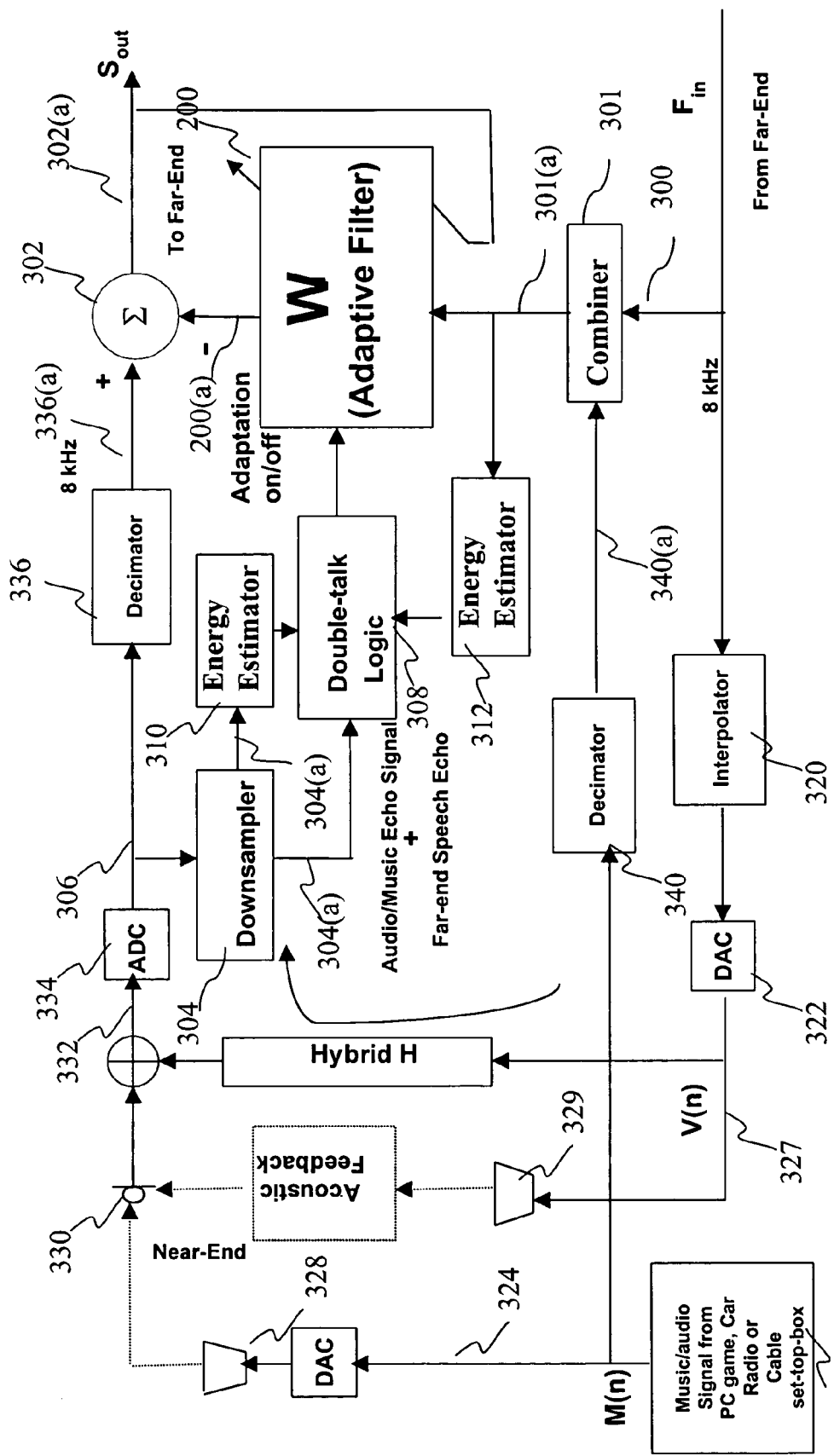
FIG. 7 is a simplified block diagram of an echo canceller in an integrated telephony cable set-top-box/cable modem in accordance with an exemplary embodiment of the present invention.

FIG. 7 shows a simplified schematic diagram of an exemplary stereo echo cancellation system that provides acoustic and electric echo cancellation. In this embodiment common reference numerals may be used to represent like components. The acoustic echo may result from a communication device such as a hands free speaker phone having a near end microphone 330 exposed to a loudspeaker 329 driven by a far end signal or a secondary audio signal. Acoustic feedback problems may also occur when the near end microphone 330 picks up the far end loudspeaker signal or a second audio signal and redirects it back to the remote end. As a result, the remote party may hear a delayed version of their own speech or of the secondary audio signal.

In the described exemplary echo cancellation system, combiner 301 combines a downsampled secondary audio signal 340(a) and far end reference signal 300 into a single 8 kHz combined reference signal 301(a). The combined reference signal 301(a) may then be input into a single 8 kHz adaptive filter 200 rather than using two adaptive filters, one at 8 kHz and the other at 48 kHz as described in connection with FIG. 5. Therefore, the described exemplary embodiment requires less memory and processing resources.

The described exemplary adaptive filter 200 models the impulse response of the acoustic echo path, such as for example, between the loudspeaker 329 and microphone 330 in parallel with the impulse response between the transmit channel and the receive channel of the network interface. As previously described, the adaptive filter 200 may be a linear transversal filter or other suitable finite impulse response filter.

The adaptive filter 200 converges or adapts only in the absence of near end speech. Therefore, near end speech and/or noise present on a decimated near end signal 336(a), typically referred to as the double talk condition, may cause the adaptive filter 200 to diverge. To avoid divergence, double talk logic 308 selectively enables the adaptive filter 200. The described exemplary embodiment is not limited to a particular algorithm for detecting the double talk condition. However, the alternate stereo echo canceller may also utilize a sample based double talk detection algorithm to provide rapid detection of near end speech in the presence of far end speech. An exemplary sample based algorithm again includes a look ahead capability so that double talk logic may halt filter adaptation (i.e. freeze the filter taps or coefficients) before the near end speech samples reaches the difference operator 302.

In an exemplary double talk detection system, a downsampler 304 decimates a 96 kHz near end Tx data signal 306 at a ratio of 12:1. The downsampler 304 forwards decimated near end data samples 304(a) to double talk logic 308 at an 8 kHz sample rate. To minimize delay, the downsampler 304 does not low pass filter the near end Tx data samples 306 prior to decimation. Aliasing components that may be created are insignificant in that the output of the downsampler 304(a) simply drives the double talk detection logic 308 and is not transmitted to the far end. An energy estimator 310 estimates the background noise level of the decimated near end signal 304(a) and forwards the estimated level to the double talk logic 308. The energy estimator 310 may be a low pass filter with a long time constant, on the order of about 10 seconds. With a long time constant the energy estimator tends to track the minimum energy level of the decimated near end signal 304(a). A second energy estimator 312 estimates the short term energy of combined reference signal 301(a).

Figure 8:
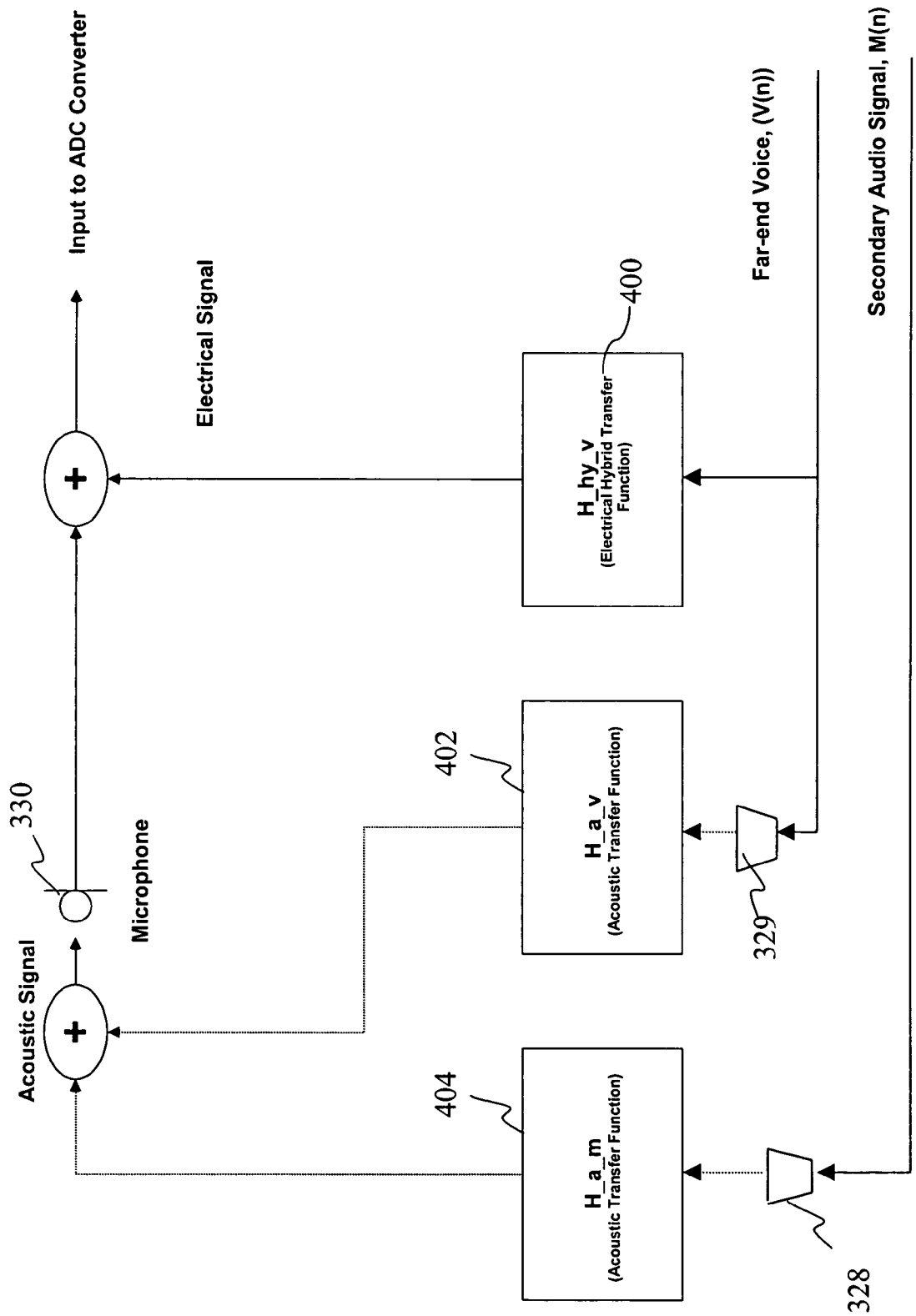
FIG. 8 illustrates the parallel transfer functions modeled by the adaptive filter of FIG. 7 in accordance with an exemplary embodiment of the present invention.

Referring to FIG. 8, in the described exemplary embodiment, the adaptive filter models in parallel the transfer functions of each of the three possible echo paths. Specifically, the adaptive filter models the transfer function 400 of the electrical echo path resulting from reflections of the far end voice created by the impedance mismatch at the two-four wire conversion in the hybrid. The adaptive filter also models the transfer function of the acoustic echo path 402 between the secondary audio signal being broadcast by speaker 328 and the microphone 330 as well as the transfer function of the acoustic echo path 404 between the speaker 329 broadcasting the far end voice signal and the microphone 330.

Referring back to FIG. 7, the double talk logic 308 utilizes a sample based algorithm to detect the presence of near end speech without incurring the delays associated with conventional systems in accordance with the following equation:

$$|Near|>MAX\{H_{a\_v},H_{hy\_v}\}*Peak\{|V(n)|\}+ H_{a\_m}*Peak\{|M(n)|\}+Background\_Noise(n)$$

The double talk logic 308 declares near end speech active when the absolute value of the near end Tx data signal 306 is greater than the weighted sum of the voice signal V (n), secondary audio signal M(n), and the background noise. In the described exemplary embodiment, a peak statistic of the voice signal V(n) 327 is multiplied by the maximum of either the acoustic gain of the acoustic voice echo path from the speaker 329 to the microphone 330, or the gain of the electrical echo path caused by reflections at the hybrid.

In general, audio signals will attenuate rapidly as a function of distance from the speaker, typically on the order of about 6 db/ft. In most applications, the microphone is physically isolated from the unit's speakers to maximize this attenuation. The hybrid gain on the other hand is generally a constant typically less than about one-half. Therefore, in most applications the hybrid gain will dominate for weighing the far end voice samples.

Similarly a peak statistic of the secondary audio signal M(n) is multiplied by the acoustic gain of the acoustic echo path from the second speaker 328 to the microphone 330. The background noise for a typical voice channel is on the order of about −70 dBm which is far less than average active speech levels, which are typically in the order of about −25 dBm. The background noise estimate is therefore initialized to a value of about −70 dBm and thereafter periodically updated by the energy estimator 310. The peak statistic of the voice V(n) and the secondary audio M(n) signals are defined by the following logic:

If $\max\{A*[|V(n)|,\ldots,|V(n-L-1)|]\}>V(n-1)$ then $Peak(n)=\max\{A[|V(n)|,\ldots,*|V(n-L-1)|]\}$ else $Peak(n)=d*Peak(n-1);$ where A is a weighting function that is greater than zero and less than or equal to one. The parameter L is the number samples over which the maximum is determined, typically in the range of zero to one hundred and twenty eight samples. In the described exemplary embodiment L is on the order of about sixty four samples. The parameter d is generally a constant that is also greater than zero and less than or equal to one and in the described exemplary embodiment on the order of about 0.99. Therefore, to determine the peak statistic of the far end, the double talk logic applies a weighting factor A to the absolute value of the current sample (V(n), M(n)) and previous L samples (V(n−L), M(n−L)). If the maximum product is greater than the previous peak statistic Peak(n−1) then the current peak statistic Peak(n) is set at the maximum of the product of the weighting factor and far end samples. Otherwise the current peak statistic Peak(n) is set equal to d times the value of the previous peak statistic Peak(n−1).

In the described exemplary embodiment, A, L and d are empirically determined to optimize performance and computational load for a given application. For example, double talk logic 212 can more accurately detect near end speech if the maximum is determined over a larger number of samples L. However, computational intensity also increases with increasing number of samples L. A and d can be inversely related to the number of sample L, so that A and d are smaller for larger number of samples and vice versa.

In the described exemplary embodiment, there is a delay associated with decimator 336. However, downsampler 304 does not low pass filter the near end TX data signal 306 and therefore does not have a corresponding delay. Therefore, the double talk logic 308 receives downsampled near end Tx data samples 304(a) with negligible delay and can process near end Tx data samples prior to their arrival at difference operator 302. Thus, the delay associated with the second decimator 336 provides a look-ahead of N samples allowing the double talk logic 308 to disable adaptation of the adaptive filter 200 N samples before the near-end signal reaches the difference operator 302. The look ahead capability N is equivalent to the delay associated with the second decimator 336 and is typically two to three 8 kHz samples for a ITU-T G712 compliant system.

An interpolator 320 upsamples the far end signal from 8 to 96 kHz. The interpolator 320 may be implemented with a FIR filter that may be either minimum phase or linear phase. A digital to analog converter 322 converts the digital interpolated signal 320(a) to an analog signal 327 that is then transmitted to the near end. In one embodiment, an audio/music signal may be present on the far end signal resulting in near end acoustic feedback. The audio signal may result for example, from an integrated telephony-ready cable-set-top-box. The music signal 324 may be the result of a movie or a video game 326 playing out speaker 328 transmitted via a microphone 330 during a simultaneous two-way phone-call. Thus, the music signal 324 may act either as a noise source or as the near-end talker's voice. Similarly, an acoustic echo may result if near end microphone 330 is exposed to the output of the loudspeaker 329 when the loudspeaker is driven by a far end signal. These additional signals may create a double-talk condition at substantially all times.

Analog near end samples 332 having audio/music feedback and far end speech echo are received by an analog to digital converter 334 that converts the received signal 332 into a digital format. A decimator 336 downsamples the received digital signal 306 from 96 kHz to a 8 kHz rate. The decimator 336 can be implemented with a FIR filter. The difference operator 302 cancels unwanted echo by subtracting the decimated signal 336(a) from the filter output signal 200(a).

A decimator 340 may decimate the music signal 324 so that the sample rate of the music signal matches the sample rate of the far end reference signal 300, i.e. 8 kHz in the described exemplary embodiment. Combiner 301 combines decimated music signal 340(a) and the far end reference signal 300 into a single 8 kHz input 301(a) to the adaptive filter 200.

Figure 9:
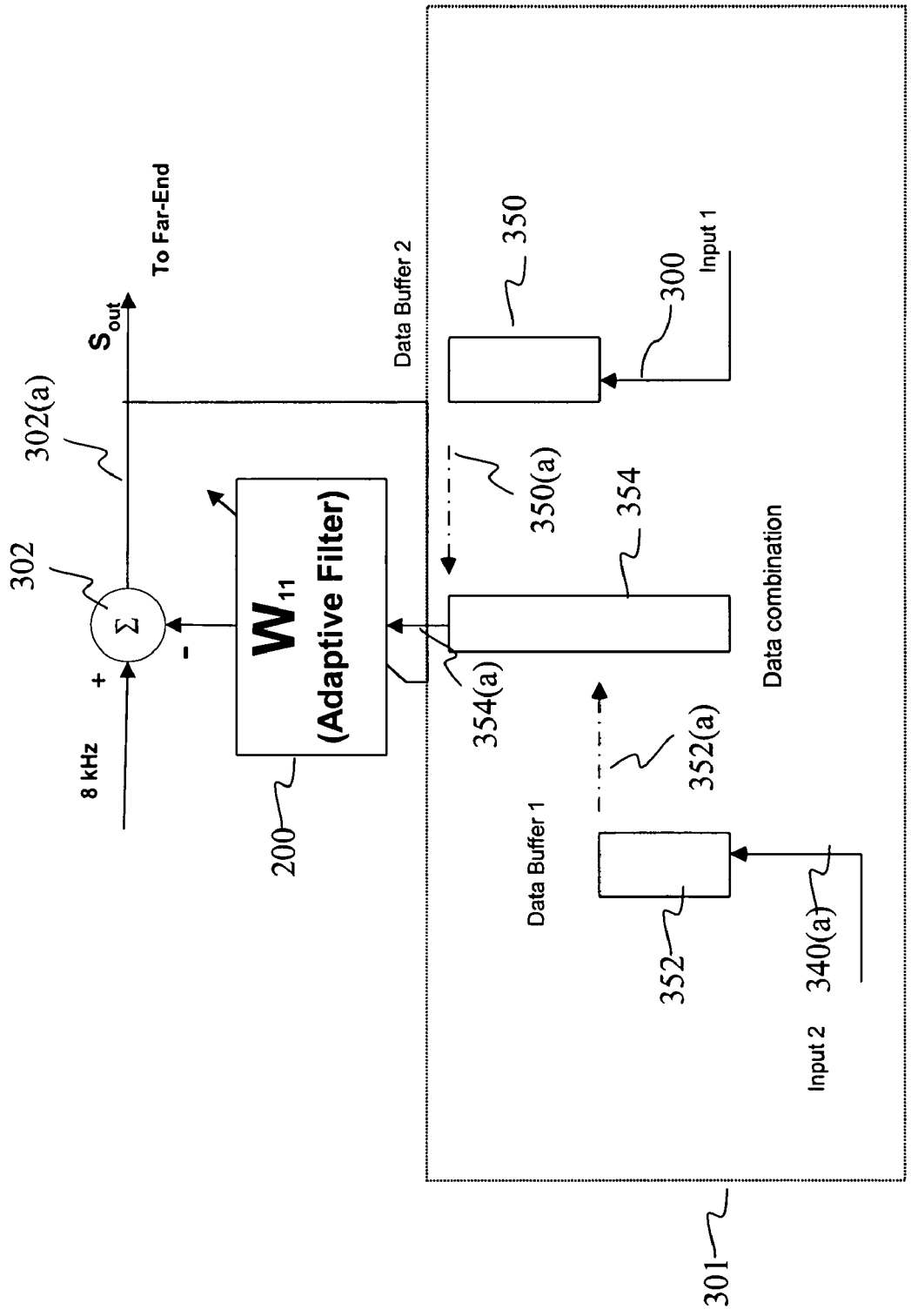
FIG. 9 shows the input data path wherein multiple inputs are combined to form a single reference signal input into the adaptive filter of FIG. 7, in accordance with an exemplary embodiment of the present invention.

Referring to FIG. 9, an exemplary combiner 301 may again include a first buffer 350 that receives the far end reference signal 300 and a second buffer 352 that receives the decimated music signal 340(a). Buffer outputs 350(a) and 352(a) are combined in a third buffer 354 whose output 354(a) is forwarded to the adaptive filter 200. One of skill in the art will appreciate that a single buffer could be used to directly combine the decimated music signal 340(a) and far end reference signal 300.

The adaptive filter may be a linear transversal filter or other suitable finite impulse response filter. The adaptive filter 200 may again be based upon a normalized least mean square algorithm (NLMS) as described in S. Haykin, Adaptive Filter Theory, and T. Parsons, Voice and Speech Processing. The adaptive filter 200 may again use an error signal feedback control as previously described with regards to FIG. 5.

While only a number of exemplary embodiments have been described, a variety of modifications and adaptations can be made without departing from the spirit and scope of the present invention. In addition, those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. An echo canceller comprising:
   a combiner for combining a secondary audio signal and a far end primary telephony signal into a single combined reference signal, wherein the secondary audio signal comprises secondary near end acoustic and electrical signals; and
   an adaptive filter coupled to the combiner for receiving the single combined reference signal as input, the adaptive filter having filter coefficients adapted to cancel a combination of an electrical and an acoustical echo in a near end signal by modeling in parallel the electrical echo, caused by imperfect impedance matching of network transmission sections, comprising at least a portion of the primary telephony signal and the acoustical echo comprising at least a portion of the secondary audio signal.

2. The echo canceller of claim 1 wherein said adaptive filter comprises a finite impulse response filter.

3. The echo canceller of claim 2 wherein the finite impulse response filter comprises a linear transversal filter.

4. The echo canceller of claim 1 further comprising double talk logic to detect speech in the near end signal in presence of the secondary audio signal, said double talk logic controlling filter adaptation of the adaptive filter as a function of detection of speech in the near end signal.

5. The echo canceller of claim 1 wherein said secondary audio signal comprises a pulse metering tone.

6. The echo canceller of claim 1 further comprising a buffer, coupled to input of said adaptive filter, to combine said secondary audio signal and said primary telephony signal.

7. The echo canceller of claim 6 further comprising a decimator that downsamples the secondary audio signal to match a sample rate of the primary telephony signal.

8. The echo canceller of claim 6 wherein said adaptive filter generates an echo estimate of the combined secondary audio signal and the primary telephony signal, the cancellation of the echo in the near end signal being a function of the echo estimate.

9. The echo canceller of claim 8 further comprising a difference operator to subtract the echo estimate of said combined secondary audio signal and said primary telephony signal from the near end signal.

10. The echo canceller of claim 9 wherein output of said difference operator is feedback to the adaptive filter as an error signal for filter adaptation.

11. An echo canceller, comprising:
    an adaptive filter having filter coefficients adapted to cancel an echo in a near end signal, the echo comprising an acoustic echo and an electrical echo, wherein the adaptive filter models in parallel the acoustic echo and the electrical echo and the filter coefficients are adapted to cancel a combination of the acoustic echo and the electrical echo, caused by imperfect impedance matching of network transmission sections.

12. The echo canceller of claim 11 wherein said acoustic echo comprises at least a portion of a secondary audio signal broadcast by a speaker and received by a near end microphone coupled to said echo canceller.

13. The echo canceller of claim 12 wherein a set top box generates said secondary audio signal.

14. The echo canceller of claim 12 wherein said electrical echo comprises at least a portion of a far end telephony signal.

15. The echo canceller of claim 14 further comprising a buffer, coupled to input of said adaptive filter, to combine said secondary audio signal and said far end telephony signal.

16. The echo canceller of claim 15 further comprising a decimator that downsamples said secondary audio signal to match a sample rate of said far end telephony signal.

17. The echo canceller of claim 15 wherein said adaptive filter generates an echo estimate of said combined secondary audio signal and said far end telephony signal, said echo canceller being a function of said echo estimate.

18. The echo canceller of claim 17 wherein said adaptive filter comprises a finite impulse response filter.

19. The echo canceller of claim 18 wherein the finite impulse response filter comprises a linear transversal filter.

20. The echo canceller of claim 17 further comprising a difference operator to subtract the echo estimate of said combined secondary audio signal and said far end telephony signal from the near end signal.

21. The echo canceller of claim 12 further comprising double talk logic to detect speech in the near end signal in presence of the secondary audio signal, wherein said double talk logic controls filter adaptation of the adaptive filter as a function of detection of speech in the near end signal.

22. A data transmission system, comprising:
    a first telephony device that outputs a far end signal; and
    a second telephony device coupled to the first telephony device, the second telephony comprising an adaptive filter having filter coefficients adapted to cancel an echo in a near end signal, the echo comprising an acoustic echo and an electrical echo, wherein the adaptive filter models in parallel the acoustic echo and the electrical echo and the filter coefficients are adapted to cancel a combination of the acoustic echo and the electrical echo, caused by imperfect impedance matching of network transmission sections.

23. The data transmission system of claim 22 wherein said second telephony device comprises a speaker for broadcasting a secondary audio signal, said acoustic echo comprising at least a portion of said broadcast secondary audio signal received by a near end microphone of said second telephony device.

24. The data transmission system of claim 23 wherein said second telephony device comprises a set top box, wherein said set top box generates said secondary audio signal.

25. The data transmission system of claim 23 wherein said electrical echo comprises at least a portion of a far end telephony signal.

26. The data transmission system of claim 25 wherein said secondary telephony device further comprises a decimator that downsamples said secondary audio signal to match a sample rate of said far end telephony signal.

27. The data transmission system of claim 25 wherein said secondary telephony device further comprises a buffer, coupled to input of said adaptive filter, for combining said secondary audio signal and said far end telephony signal.

28. The data transmission system of claim 27 wherein said adaptive filter generates an echo estimate of said combined secondary audio signal and said far end telephony signal.

29. The data transmission system of claim 28 wherein said adaptive filter comprises a finite impulse response filter.

30. The data transmission system of claim 29 wherein the finite impulse response filter comprises a linear transversal filter.

31. The data transmission system of claim 28 wherein said second telephony device further comprises a difference operator to subtract the echo estimate of said combined secondary audio signal and said far end telephony signal from the near end signal.

32. The data transmission system of claim 23 wherein said second telephony device further comprises double talk logic to detect speech in the near end signal in presence of the secondary audio signal, wherein said double talk logic controls filter adaptation of said adaptive filter as a function of the detection of speech in the near end signal.

33. A method of canceling an echo in a near end signal, said echo having a primary telephony component and a secondary audio component, the method comprising:
   combining a primary telephony signal and a secondary audio signal to form a single reference signal;
   adaptively filtering the reference signal using filter coefficients adapted for canceling a combination of an acoustic echo and an electrical echo by modeling in parallel the acoustic echo and the electrical echo, caused by imperfect impedance matching of network transmission sections; and
   subtracting the filtered reference signal from the near end signal.

34. The method of claim 33 further comprising re-sampling said secondary audio signal to match a sample rate of said primary telephony signal prior to combining said primary telephony and secondary audio signal.

35. The method of claim 33 further comprising detecting speech in the near end signal in presence of the secondary audio signal and controlling filter adaptation as a function of the detection of the near end speech.

36. The method of claim 33 wherein the adaptive filtering of the reference signal comprises generating an estimate of said echo as a function of a transfer function of electrical and acoustic echo paths.

37. An echo canceller for canceling an echo in a near end signal, said echo having a primary telephony component and a secondary audio component, comprising:
   combining means for combining a primary telephony signal and a secondary audio signal to form a single reference signal;
   filtering means for adaptively filtering the reference signal, the filtering means having filter coefficients that are determined to cancel a combination of an acoustic echo and an electrical echo, wherein the adaptive filter models in parallel the acoustic echo and the electrical echo, caused by imperfect impedance matching of network transmission sections; and
   means for subtracting the filtered reference signal from the near end signal.

38. The canceller of claim 37 further comprising means for re-sampling said secondary audio signal to match a sample rate of said primary telephony signal prior to combining said primary telephony and secondary audio signal by the combining means.

39. The echo canceller of claim 37 further comprising means for detecting speech in the near end signal in presence of the secondary audio signal and means for controlling filter adaptation of the filtering means as a function of the detection of near end speech.

* * * * *

UNITED STATES PATENT AND TRADEMARK OFFICE
CERTIFICATE OF CORRECTION

| | | |
|---|---|---|
| PATENT NO. | : 7,747,002 B1 | Page 1 of 1 |
| APPLICATION NO. | : 09/703264 | |
| DATED | : June 29, 2010 | |
| INVENTOR(S) | : Thi et al. | |

It is certified that error appears in the above-identified patent and that said Letters Patent is hereby corrected as shown below:

Column 6
Line 26, please replace "(Rin)" with --($R_{in}$)--.

Column 7
Line 15, please replace "$w_{11}(j)Re\, f_{in}(n-j)$" with --$w_{11}(j)Ref_{in}(n-j)$--.

Column 7
Line 53, please replace "Eref" with --$E_{ref}$--.

Signed and Sealed this

Sixteenth Day of November, 2010

David J. Kappos
*Director of the United States Patent and Trademark Office*